May 5, 1936.  J. W. TATTER  2,040,034
CLUTCH
Filed June 19, 1931   2 Sheets-Sheet 1
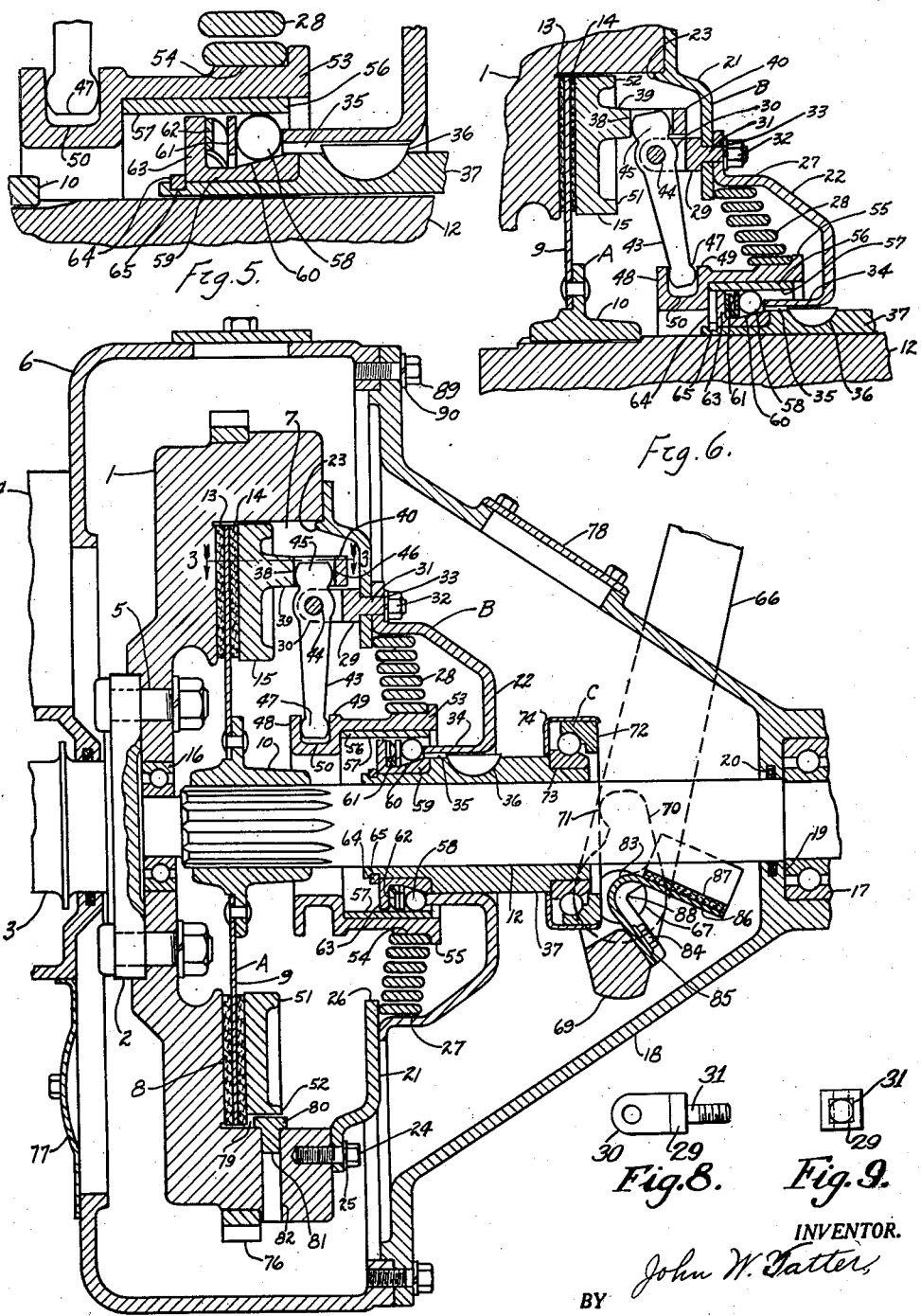
INVENTOR.
John W. Tatter,
BY George B. Ingersoll.
ATTORNEY.

May 5, 1936.  J. W. TATTER  2,040,034
CLUTCH
Filed June 19, 1931  2 Sheets-Sheet 2
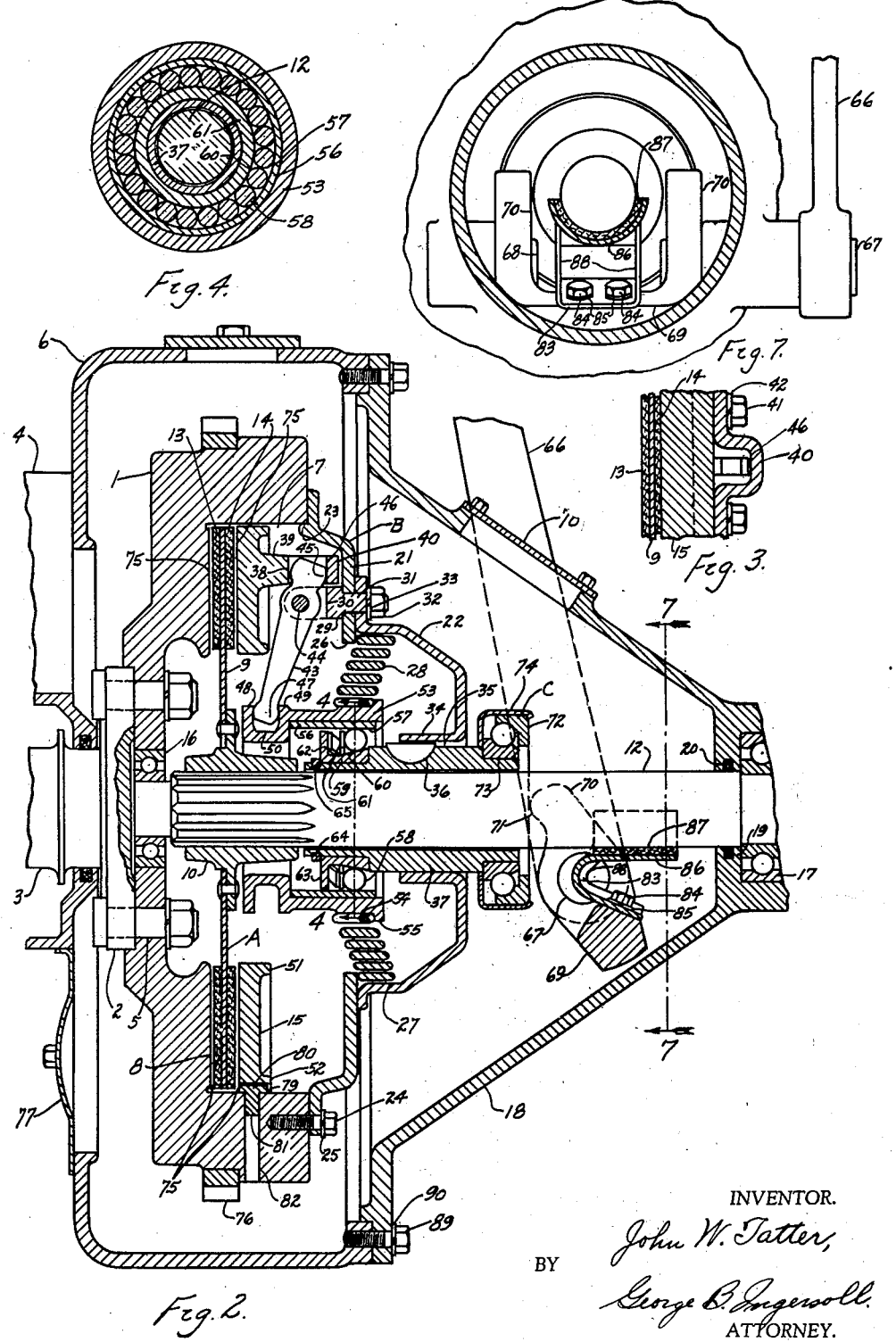
INVENTOR.
John W. Tatter,
BY George B. Ingersoll,
ATTORNEY.

Patented May 5, 1936

2,040,034

UNITED STATES PATENT OFFICE 2,040,034

CLUTCH

John W. Tatter, Detroit, Mich., assignor of one-half to George B. Ingersoll, Dearborn, Mich.

Application June 19, 1931, Serial No. 545,449

14 Claims. (Cl. 192—68)

My invention relates to improvements in clutches for motor vehicles, said clutches comprising friction members, and the objects of my improvement are, first, to provide a clutch with automatic means for taking up wear in friction members, said clutch being provided with a single large thrust spring; second, to provide a clutch having a cover plate, the cover plate having a separate cover member together with a thrust spring located between the said cover member parts; third, to provide a clutch having automatically operated means for taking up wear in friction members, said means engaging a removably mounted sleeve member; and, fourth, to provide a clutch having a pair of cover members with means for fastening them together, said means supporting a lever member.

I attain these objects by the mechanism illustrated in the accompanying drawings, in which—

Figure 1 is a sectional view of a clutch assembly within the flywheel of a motor together with its enclosing housings, said view disclosing the clutch members in their engaged position; Fig. 2, a sectional view of a clutch assembly within the flywheel of a motor together with its enclosing housings, said view disclosing the clutch in its disengaged position; Fig. 3, a sectional view taken on the line 3—3, Fig. 1; Fig. 4, a sectional view taken on the line 4—4, Fig. 2; Fig. 5, a partial longitudinal section disclosing a locking ball member in an unlocked but associated position relative to its sleeve members, said partial section being taken on the center line of the clutch assembly; Fig. 6, a partial sectional view of the clutch assembly disclosing the positions of the various parts when the friction disc members are practically worn out; Fig. 7, a sectional view taken on the line 7—7, Fig. 2; Fig. 8, a side elevation of one of the yoke members for supporting the levers for operating the thrust member; and Fig. 9, an end elevation of the yoke member disclosed in Fig. 8.

Similar numerals refer to similar parts throughout the several views.

The flywheel 1 is mounted on the flange 2 of a crankshaft 3 of an engine, supported in the crankcase 4. The flywheel 1 is held onto the flange 2 by the bolts 5. The crankcase 4 is provided with a bell housing 6 in which the flywheel 1 revolves. The flywheel 1 is provided with the chamber 7, together with the friction face 8. The driven member assembly A comprises the friction disc 9 which is fastened to the hub 10, the hub 10 being suitably mounted on the splines of the shaft 12. The friction members 13 and 14 may be suitably fastened to the friction disc 9, the friction member 13 being disposed between the friction face 8 of the flywheel 1 and the face of the friction disc 9. Friction member 14 is similarly disposed between the friction disc 9 and the thrust member 15. The shaft 12 is supported at its front end in the bearing assembly 16, which is mounted in a recess of the flywheel 1, and at its rear end in the bearing assembly 17, which may be mounted in the end of the clutch housing 18.

The bearing assembly 17 is retained by the shoulder 19 of the clutch housing 18, the shoulder portion 19 being provided with a recess for containing the packing 20. The bearing assembly 17 is also further suitably retained in the transmission assembly (not shown), which is mounted in the usual way in the rear of the clutch housing 18.

The cover assembly B comprises the main cover plate 21, together with the cover member 22. The main cover plate 21 is provided with the projections 23, which serve as piloting members within the chamber 7 of the flywheel 1. The cover plate 21 is suitably fastened to the rear face of the flywheel 1 by the screws 24 and the lock washers 25. The cover plate 21 is provided with a central opening 26, which is sufficiently smaller in size than the inside diameter 27 of the cover member 22, thus providing a shoulder for retaining the thrust spring 28, the outside portion of the thrust spring 28 extending within the chamber portion of the cover member 22. The yoke members 29 are provided with the fork portion 30 together with the portions 31 for extending through suitable holes in the cover plate 21 and the cover member 22, the portions 31 being made with a rectangular shape to prevent turning in the cover plate 21 and the cover member 22. The portions 31 of the yoke members 29 may be provided with threaded ends for engaging the nuts 32 and the lock washers 33, the nuts 32 and the lock washers 33 thus fastening the yoke members 29 in position. The cover member 22 is provided with an extension portion 34, which is further provided with a keyway 35 in which slidably operates the key 36, which is suitably fastened in the sleeve 37. The sleeve 37, if desired, can be made a reasonably close fit around the shaft 12 to further aid in guiding the sleeve 37 in its sliding movement.

The thrust member 15 is provided with a surface 38 at the end of the bosses 39, to which are fastened the members 40 by the screws 41 and the lock washers 42. The levers 43 are mounted in the fork portions 30 of the yoke members 29, the levers 43 being retained therein by the pins 44. The outer end 45 of the lever 43 extends within and operates within the chamber formed by the surface 38 and the inner surface 46 of the member 40. The levers 43 are provided at their inner portions with the ends 47 for engaging the grooved surfaces of the flanges 48 and 49 of the sleeve 53, the grooved surfaces being formed at the sides of the groove 50 of the sleeve 53. The thrust member 15 is provided with an inner rib 51 and an outer rib 52, extending around the periphery of the thrust member to provide additional strength. The sleeve 53 is provided with the surface 54 on which is supported the inner diameter of the thrust spring 28.

The sleeve 53 is further provided with the shoulder portion 55 which takes the thrust load of the thrust spring 28 at its inner diameter, the thrust load at the outer diameter of the thrust spring 28 being taken by the shoulder portion adjacent to the central opening 26 of the cover plate 21. The sleeve 53 is provided with the sleeve member 56 which may be suitably fastened within the sleeve 53, the sleeve member 56 being hardened and ground, its inner surface 57 engaging the ball members 58. The member 59 may be pressed onto a diameter of the sleeve 37, the member 59 being provided with a conico-cylindrical surface 60 extending therearound. The member 59 engages the ball members 58, the ball members 58 being wedged between the conico-cylindrical surface 60 of the member 59 and the inner surface 57 of the sleeve member 56 when the clutch is being operated to its released position, as hereinafter described. Any suitable number and size of ball members 58 may be provided to withstand a given load as developed by the clutch mechanism. The ball members 58 are retained by the inner surface 57 of the sleeve member 56 and the conico-cylindrical surface 60 of the member 59 and also by the washer 61, which is further retained by the resilient member 62, the resilient member 62 having offset portions to engage the washer 61 and the shoulder portion 63 of the member 59. The shoulder portion 63 may be of such a diameter as to slide within the sleeve member 56 with the proper clearances between its outside diameter and the inner surface 57 of the sleeve member 56. The member 59 together with its supported parts is retained on the sleeve 37 by means of the lock ring 64, which may be of the usual open end type, thus providing for the easy removal of the lock ring 64 and for its ready installation within the groove 65 of the sleeve 37.

It is to be noted that the ball members 58 will also engage the ends of the extension portion 34 of the cover member 22 when the clutch is in its engaged position, as shown in Figs. 1 and 5. It is also to be noted that the resilient member 62 will tend to always force the washer 61, which will in turn always tend to force the member 59 together with the sleeve 37 and the ball members 58 to a position in which the ball members 58 will engage the conico-cylindrical surface 60 of the member 59 and the inside surface 57 of the sleeve member 56.

The pedal 66 is suitably mounted on and connected to the shafts 67 and 68, the shafts 67 and 68 being suitably connected to and supporting the yoke member 69, the pedal 66 being located on the outside of the clutch housing 18 in the conventional manner as employed in motor vehicles. The shafts 67 and 68 are suitably supported in bearings carried on opposite sides of the clutch housing 18. The yoke member 69 is provided with a pair of arms 70 which extend upwardly on each side of the main shaft 12 and are provided with rounded portions 71, which engage the rear face of the race member 72 of the bearing assembly C. The inner race member 73 of the bearing assembly C is suitably fastened on the sleeve 37. The race members 72 and 73 are suitably held together by the retainer member 74. It is to be noted that, when the operator depresses the pedal 66, the rounded portions 71 of the yoke member 69 will engage the face of the bearing assembly C, thus forcing the bearing assembly C and the sleeve 37 to slidably move along the extension portion 34 of the cover member 22, this in turn forcing the conico-cylindrical surface 60 of the member 59 to engage the ball members 58 and force the ball members 58 against the inside surface 57 of the sleeve member 56.

It is to be noted that the conico-cylindrical surface 60 extends completely around the race member 59 and, when said race member 59 is moved along by the movement of the sleeve 37, the ball members 58 will wedge into a locking position against the inner surface 57 of the sleeve member 56, thus causing the sleeve member 56 together with the sleeve member 53 to move forward with the sleeve 37, the side wall surfaces of the groove 50 of the sleeve member 53 thus moving the ends 47 of the levers 43 towards the thrust member 15. The movement of the inner ends 47 of the levers 43 toward the thrust member 15 will cause the ends 45 of the levers 43 to engage the surfaces 46 of the members 40, this in turn causing the thrust member 15 to be moved to a released position, as shown in Fig. 2, this released position of the clutch thus establishing the clearance spaces 75 between the friction members 13 and 14 and their engaging surfaces. As the operator releases the pressure on the pedal 66 to allow the clutch to move from its released position as shown in Fig. 2 to a fully engaged position as shown in Fig. 1, the spring 28 will force the sleeve member 53 rearwardly to a position as shown in Fig. 1, the ends 47 of the levers 43 moving with the sleeve member 53, this in turn causing the ends 45 of the levers 43 to engage the surfaces 38 of the thrust member 15, this forcing the thrust member 15 forwardly to its engaged position with the friction members 13 and 14, as disclosed in Fig. 1. The sleeve 37 being still locked by the ball members 58 engaging the conico-cylindrical surface 60 of the member 59, together with the inside surface of 57 of the sleeve member 56, will cause the sleeve 37 together with its bearing assembly C to move back to a released position relative to the ball members 58 as disclosed in Fig. 5, the sleeve 37 moving rearwardly to its position as shown in the fully engaged position of the clutch as disclosed in Fig. 1, this corresponding to the slightly released position of the sleeve 37 as disclosed in Fig. 5, the conico-cylindrical surface 60 of the member 59 having moved rearwardly sufficiently to release the ball members 58 from their locked position with the inner surface 57 of the sleeve member 56 as disclosed in Fig. 5.

It is to be noted, however, that the ball members 58 are always maintained in contact with the end of the extension portion 34 of the cover member 22 by the washer 61, when the clutch is in an engaged position as disclosed in Fig. 1, said washer being actuated by the resilient member 62 to a position engaging the ball members 58. The unlocked position of the ball members 58, in which the ball members 58 will always remain in an engaged or associated position with the inner surface 57 of the sleeve 56, as disclosed in Fig. 5 corresponding to the fully engaged position of the clutch, as disclosed in Fig. 1, will allow the thrust spring 28, every time the clutch is operated to its engaged position, as shown in Fig. 1, to cause the levers 43 to move the sleeve member 53 rearwardly an additional distance, which will correspond to the amount of wear taking place on the friction members 13 and 14.

It will thus be seen that every time the clutch is operated to its fully engaged position, as disclosed in Figs. 1 and 5, the ball members will be unlocked from their engagement with the inside surface 57 of the sleeve 56 sufficiently to allow the thrust spring 28 to cause the thrust member 15 to always move forwardly in engagement with the friction members 13 and 14 to take up any wear that may have occurred in the friction members 13 and 14, the ball members 58 remaining in actual engagement with the inside surface of the sleeve 56. It will thus be seen that the clutch will provide automatically for taking up the wear clearance which may occur in its driving mechanism, so that the pedal 66 will not have to be adjusted to maintain it in its proper operating position, as is necessary in the usual design of clutches. Also, the thrust member 15 will not have to be manually operated in any way to take up clearance.

It is also to be especially noted that my invention will provide an automatically operated means that will operate continuously, while the clutch is operating in its engaged position, to take up the clearance due to wear in the friction members of said clutch.

The flywheel 1 is disclosed as being provided with a starting ring 76. Also, the bell housing 6 is provided with the inspection cover 77 and the clutch housing 18 is provided with the inspection cover 78. The thrust member 15 is provided with slots 79 in its outer periphery, the slots 79 being engaged by the rectangular portions 80 of the driving pins 81, the driving pins 81 being pressed into the holes 82 of the flywheel 1. It is to be noted that, when the clutch is in its fully engaged position as disclosed in Fig. 1, a slight clearance space will exist between the rear face of the race member 72 of the bearing assembly C and the rounded portions 71 of the arms 70.

In order to decrease the time element during which the driven member assembly A and the shaft 12, together with any gears in a transmission (not shown) which may be connected with the shaft 12, will be spinning during the releasing operation of the clutch, the yoke member 69 is provided with an angular surface on which is suitably mounted a brake bracket 83, the brake bracket 83 being fastened to the yoke member 69 by the screws 84 and the lock washers 85. The brake bracket 83 is provided with a semi-circular portion 86 to which is suitably fastened a friction facing or lining 87, the friction facing 87 being semi-circular in shape to conform to the outside diameter of the shaft 12 when the yoke member 69 and the brake bracket 83 are in the position as shown in Fig. 2, which corresponds to the released position of the clutch assembly. The brake bracket 83 may be provided with ribs 88 for reinforcement purposes. It will be readily seen that, when the clutch assembly is operated to its disengaged position, as shown in Fig. 2, the brake bracket 83 will move with the yoke member 69 to a position as disclosed in Fig. 2, in which the friction facing 87 will engage the revolving shaft 12, the friction facing 87 extending semi-circularly around the shaft 12. The operator by continuing to depress the clutch pedal 66 will thus cause the friction facing 87 to engage the shaft 12 with any desired pressure to arrest the revolving motion of the shaft 12, together with its driven member assembly A. As soon as the clutch assembly is fully engaged, as disclosed in Fig. 1, the friction facing 87 will be moved away from the shaft 12 by the movement of the brake bracket 86 and the yoke member 69. The clutch housing 18 is suitably attached to the bell housing 6 by the screws 89 and lock washers 90.

I claim:

1. In a friction clutch, the combination of a driving member, a driven member, a cover member fixed to one of said members and enclosing the other of said members, a thrust member movable longitudinally relative to said cover member, a sleeve member slidably mounted through said cover member, a lever pivotally mounted within said cover member, said lever engaging said thrust member, a second sleeve member engaging said lever, automatically operated clearance take-up means engaging said sleeve members, and a resilient member between said second mentioned sleeve member and said cover member, said resilient member actuating said thrust member to engage said driven member.

2. In a clutch, the combination of a driving member, a thrust member, a driven member, a single resilient thrust member, for actuating said thrust member, said single resilient member exerting its actuating thrust in a direction away from said thrust member, and automatically operated means for taking up wear between said driving member, said driven member and said thrust member.

3. In a clutch, the combination of a driving member, a driven member, a cover member fixed to one of said members, said cover member being provided with an extending portion together with a chamber having cylindrical walls, a sleeve member in the extension portion of said cover member, clearance take-up members adapted to engage the extension portion of said cover member together with said sleeve member, a second sleeve member engaging said clearance take-up members, and a main thrust resilient member having coils increasing outwardly in size and engaging said second sleeve member together with the cylindrical walls of the chamber of said cover member.

4. In a clutch, the combination of a driving member, a driven member, a thrust member, cover means suitably mounted on said driving member, said cover means comprising a pair of members, a resilient thrust member having one of its ends anchored adjacent the two members comprising said cover means, and means operatively connecting said thrust member and said resilient thrust member, said means including a member supporting the other of the ends of said resilient thrust member.

5. In a clutch, the combination of a cover member provided with an opening therethrough, and a cover member suitably mounted on said first mentioned cover member, said last mentioned cover member being provided with a chamber having a periphery larger than the opening in said first mentioned cover member.

6. In a clutch comprising a driving member, the combination of a cover member, a resilient thrust member in said cover member, and a second cover member suitably attached to the driving member, said cover member retaining said resilient thrust member in said first mentioned cover member.

7. In a clutch comprising a driving member, the combination of a cover member, a second cover member, means for holding said first and said second mentioned cover members together, said means extending through said first mentioned and said second cover members, and a lever member suitably mounted on said means.

8. In a clutch comprising a thrust member, the combination of a cover member suitably mounted on the clutch, said cover member being provided with an opening therethrough, a second cover member suitably mounted on said first mentioned cover member, and a resilient member operatively connected with and adapted to actuate said thrust member, said resilient member being suitably anchored at one of its ends between said cover members, said resilient member exerting a thrust in a direction away from said thrust member.

9. In a clutch provided with driving and friction members, the combination of a cover member suitably mounted on the driving member of the clutch, a second cover member suitably mounted on and providing a chamber adjacent said first mentioned cover member, and automatically operated means for taking up wear clearance of the friction members, said automatically operated means being operatively connected with the clutch, said automatically operated means being located within the chamber provided by said second cover member when the clutch is in an engaged position.

10. In a clutch, the combination of a thrust member, a cover member suitably mounted, a second cover member, a member provided with fork portions together with a portion extending through said first mentioned and said second cover members, means for securing said member, provided with fork portions, to said first mentioned and said second mentioned cover members, a lever for operating said thrust member, said lever being suitably mounted on the fork portions of said last mentioned member, and means for operating said lever.

11. In a friction clutch, the combination of a sleeve member slidably mounted and provided with a groove extending therearound adjacent its end nearest the friction clutch, a member removably mounted on said sleeve member and provided with a conico-cylindrical surface, means for locking said second mentioned member on said sleeve member, said means being retained in the groove of said sleeve member, an annular member suitably mounted in axial alignment with and adapted to move axially relative to said sleeve member, said annular member being operatively connected with the friction clutch, and movably mounted means engaging said annular member and the conico-cylindrical surface of said sleeve member to provide locking means therebetween only when the friction clutch is being operated to a disengaged position.

12. In a friction clutch, the combination of a friction member suitably mounted, a thrust member suitably mounted to engage said friction member, a sleeve member movably mounted and operatively connected with said thrust member, a helical spring suitably anchored at its outside portion and with its inside portion supported on said sleeve member, said helical spring exerting a thrust in a direction away from said thrust member to move said sleeve member away from the thrust member, a second sleeve member movably mounted, and rollably mounted members operatively connecting said first mentioned and said second sleeve members to lock said first mentioned and said second sleeve members together when the friction clutch is being operated to a disengaged position, said rollably mounted members permitting said first mentioned and said second sleeve members to move longitudinally relative to one another when the friction clutch is in an engaged position.

13. In a clutch, the combination of a driving member, a driven member, a thrust member, a pair of sleeve members, a main thrust resilient member suitably mounted and adapted to move one of said sleeve members in a direction away from said thrust member, rollably mounted members suitably mounted to engage said pair of sleeve members, said rollably mounted members locking said pair of sleeve members together to prevent longitudinal movement in one direction relative to one another, said rollably mounted members permitting longitudinal movement of said sleeve members in the other direction relative to one another, and means for operatively connecting one of said sleeve members with said thrust member.

14. In a clutch, the combination of a cover member comprising a cover having an opening therethrough, together with a wall portion for use as a closure member for the cover, and a resilient thrust member retained in said closure member, said resilient thrust member being suitably mounted between said cover and said wall portion used as a closure member, said resilient thrust member being operatively connected with the clutch and exerting a thrust to operate the clutch to an engaged position, said thrust being exerted in a direction away from the clutch.

JOHN W. TATTER.